(12) United States Patent
Samara-Rubio et al.

(10) Patent No.: US 6,600,864 B2
(45) Date of Patent: Jul. 29, 2003

(54) METHOD AND APPARATUS FOR SWITCHING AN OPTICAL BEAM USING AN OPTICAL RIB WAVEGUIDE

(75) Inventors: Dean A. Samara-Rubio, Pleasanton, CA (US); Michael T. Morse, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 233 days.

(21) Appl. No.: 09/745,335

(22) Filed: Dec. 20, 2000

(65) Prior Publication Data

US 2003/0021568 A1 Jan. 30, 2003

(51) Int. Cl.$^7$ .................................................. G02B 6/10
(52) U.S. Cl. ........................ 385/131; 385/14; 385/129; 385/130; 385/132; 385/15; 385/16
(58) Field of Search .............................. 385/1, 2, 3, 15, 385/16, 24, 49, 129, 130, 131, 132, 42, 38, 88, 89, 92, 14

(56) References Cited

U.S. PATENT DOCUMENTS

| | | | | |
|---|---|---|---|---|
| 4,888,784 A | * | 12/1989 | Hirata | 372/45 |
| 4,923,264 A | * | 5/1990 | Langer et al. | 359/245 |
| 5,109,464 A | * | 4/1992 | Munowitz et al. | 385/130 |
| 5,274,246 A | * | 12/1993 | Hopkins et al. | 257/17 |
| 6,108,478 A | * | 8/2000 | Harpin et al. | 385/129 |
| 6,215,585 B1 | * | 4/2001 | Yoshimura et al. | 359/344 |
| 6,233,378 B1 | * | 5/2001 | Sun | 385/22 |
| 6,236,774 B1 | * | 5/2001 | Lackritz et al. | 385/10 |
| 6,246,815 B1 | * | 6/2001 | Fujiwara et al. | 385/37 |
| 6,285,043 B1 | * | 9/2001 | Yap | 257/81 |
| 6,304,690 B1 | * | 10/2001 | Day | 385/134 |
| 6,310,700 B1 | * | 10/2001 | Betts | 359/2 |
| 6,310,999 B1 | * | 10/2001 | Marcuse et al. | 385/132 |
| 6,324,328 B1 | * | 11/2001 | Mehlhorn et al. | 385/129 |
| 6,330,376 B1 | * | 12/2001 | Paniccia | 359/245 |
| 6,343,171 B1 | * | 1/2002 | Yoshimura et al. | 385/14 |
| 6,421,473 B1 | * | 7/2002 | Paniccia et al. | 385/14 |
| 6,434,289 B1 | * | 8/2002 | Paniccia et al. | 385/16 |
| 6,483,954 B2 | * | 11/2002 | Koehl et al. | 385/2 |

OTHER PUBLICATIONS

E.D. Novak, L. Ding, Y.T. Loh, and C. Hu, "Speed, Power, and Yield Comparison of Thin Bonded SOI versus Bulk SMOS Technologies", in *Proceedings 1994 IEEE International SOI Conference*, Oct. 1994, VLSI Technology, Inc., San Jose, CA, pp. 41–42.

(List continued on next page.)

*Primary Examiner*—Brian Healy
(74) *Attorney, Agent, or Firm*—Blakely, Sokoloff, Taylor & Zafman LLP

(57) ABSTRACT

An optical switch including an optical rib waveguide. In one embodiment, the disclosed optical switch a first optical confinement layer disposed between first and second semiconductor substrate layers. A second optical confinement layer is disposed proximate to the first semiconductor substrate layer. The first semiconductor substrate layer is disposed between the first and second optical confinement layers. First and second lateral optical confinement regions are disposed proximate to the first optical confinement layer. A rib region is included in the first semiconductor substrate layer. The rib region is disposed proximate to the first optical confinement layer and between the first and second lateral optical confinement regions. A slab region is included in the first semiconductor substrate walk layer and is disposed proximate to the second optical confinement layer. The slab region is disposed between the second optical confinement layer and the rib region and the first and second lateral optical confinement regions.

26 Claims, 5 Drawing Sheets

OTHER PUBLICATIONS

A.G. Rickman, G.T. Reed, and F. Namavar, "Silicon–on–Insulator Optical Rib Waveguide Loss and Mode Characteristics", in *Journal of Lightwave Technology. vol. 12. No. 10.*, Oct. 1994, pp. 1771–1776.

R.A. Soref, J. Schmidtchen, and K. Petermann, "Large Single–Mode Rib Waveguides in GeSi–Si and Si–on–SiO2", in IEEE Journal of Quantum Electronics. vol. 27. No. 8., Aug. 1991, pp. 1971–1974.

S.P. Pogossian, L. Vescan, and A. Vonsovici, "The Single–Mode Condition for Semiconductor Rib Waveguides with Large Cross Section", in Journal of Lightwave Technology. vol. 16. No. 10., Oct. 1998, pp. 1851–1853.

H. Zimmermann, "Integrated Silicon Optoelectronics", in Springer Series in Photonics, 2000, pp. 203–228, Springer Verlag Berlin Heidelberg, Germany.

* cited by examiner

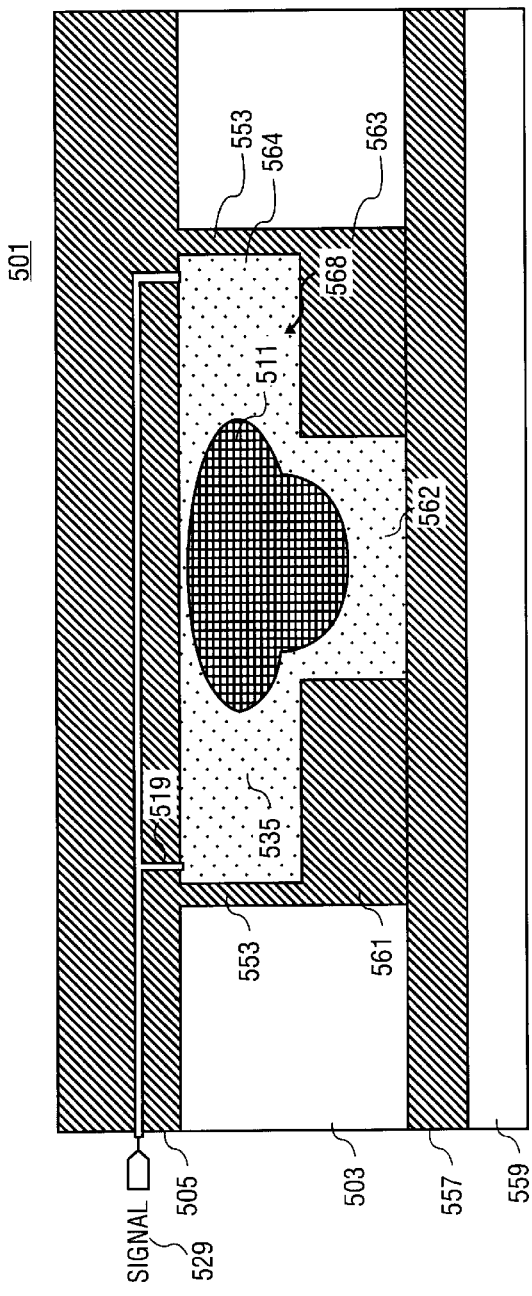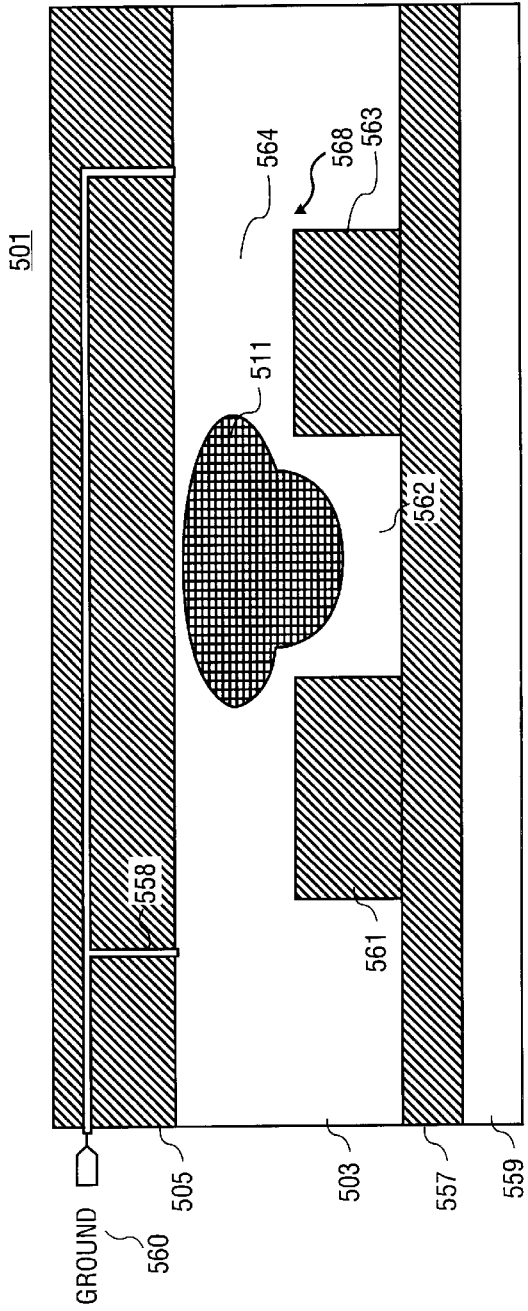

METHOD AND APPARATUS FOR SWITCHING AN OPTICAL BEAM USING AN OPTICAL RIB WAVEGUIDE

BACKGROUND OF THE INVENTION

1. Field of the Invention

The present invention relates generally to the switching signals and, more specifically, the present invention relates to switching or modulating optical signals.

2. Background Information

The need for fast and efficient optical switches is increasing as Internet data traffic growth rate is overtaking voice traffic pushing the need for optical communications. Two commonly found types of optical switches are mechanical switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally rely upon the actual mechanical movement of physical parts or components, MEMS are generally limited to slower speed optical applications, such as for example applications having response times on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate ($LiNbO_3$).

Lithium niobate is a transparent, material that exhibits electro-optic properties such as the Pockels effect. The Pockels effect is the optical phenomenon in which the refractive index of a medium, such as lithium niobate, varies with an applied electric field. The varied refractive index of the lithium niobate may be used to provide switching. The applied electrical field is provided to present day electro-optical switches by external control circuitry.

Although the switching speeds of these types of devices are very fast, for example on the order of nanoseconds, one disadvantage with present day electro-optic switching devices is that these devices generally require relatively high voltages in order to switch optical beams. Consequently, the external circuits utilized to control present day electro-optical switches are usually specially fabricated to generate the high voltages and suffer from large amounts of power consumption. In addition, integration of these external high voltage control circuits with present day electro-optical switches is becoming an increasingly challenging task as device dimensions continue to scale down and circuit densities continue to increase.

BRIEF DESCRIPTION OF THE DRAWINGS

The present invention is illustrated by way of example and not limitation in the accompanying figures.

FIG. 5A is a cross-section illustration through a trench capacitor of one embodiment of an optical switch including an optical rib waveguide in accordance with the teachings of the present invention.

FIG. 5B is a cross-section illustration between trench capacitors of one embodiment of an optical switch including an optical rib waveguide in accordance with the teachings of the present invention.

DETAILED DESCRIPTION

Figure 1:
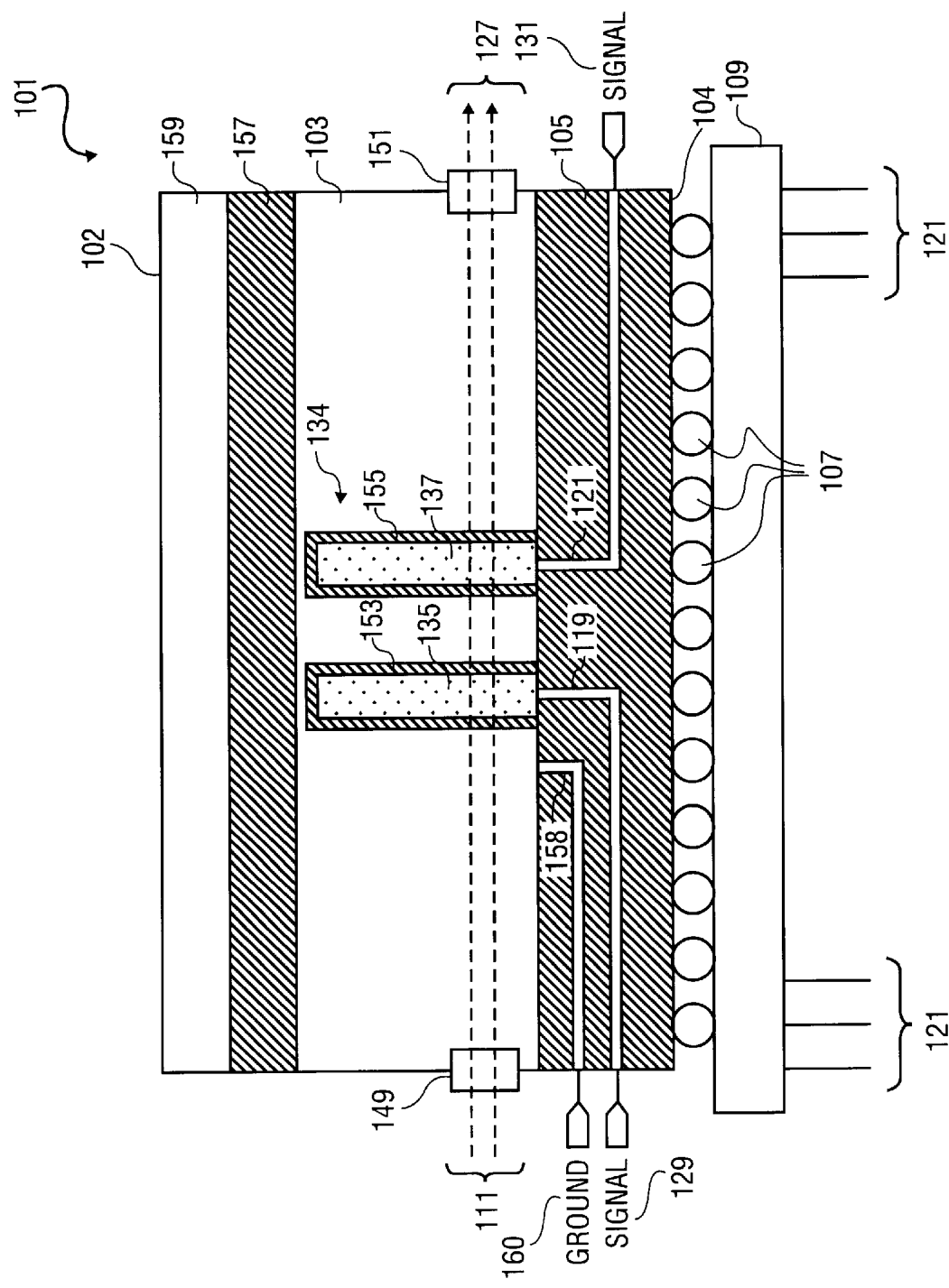
FIG. 1 is a side view illustration of one embodiment of an optical switch including an optical switching device in accordance with the teachings of the present invention.

Methods and apparatuses for switching or modulating an optical beam in an optical switch are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

In one embodiment of the present invention, a semiconductor-based optical switch or modulator is provided in a fully integrated solution on a single integrated circuit chip. One embodiment of the presently described optical switch includes an optical rib waveguide disposed in a semiconductor substrate and can be used in a variety of high bandwidth applications including multi-processor, telecommunications, networking or the like.

In one embodiment, conductors or signal lines are coupled to regions of the optical rib waveguide outside an optical path in accordance with the teachings of the present invention. In one embodiment, the optical rib waveguide is formed in a silicon on insulator (SOI) wafer including a multiple semiconductor substrate layers and multiple optical confinement layers. In one embodiment, a rib region of the optical rib waveguide is disposed proximate to a buried oxide layer of the SOI wafer serving as one of the plurality of optical confinement layers. In that embodiment, the slab region of the optical rib waveguide is disposed proximate to a dielectric layer through which conductors of the SOI are routed. In that embodiment, the dielectric layer serves as another one of the plurality of optical confinement layers.

In one embodiment, the presently described optical switching device is used to modulate an optical beam and includes an array of trench capacitors disposed in an optical rib waveguide in a silicon semiconductor substrate layer.

The array of trench capacitors may also be referred to as a phase array and may be used to switch, modulate, route, etc. an optical beam in accordance with the teachings of the present invention. Charge in the array is modulated by the trench capacitors to modulate the optical beam directed through the array in response to a signal.

In one embodiment, the control circuitry used to generate the signal to modulate the optical beam is integrated in the same die as the array. Thus, in one embodiment the array and the control circuitry are fully integrated on the same integrated circuit chip. In one embodiment, the optical beam is switched by the array selectively attenuating the optical beam. In another embodiment, the optical beam is switched by selectively modulating the phase of at least a portion of the optical beam.

FIG. 1 is a side view illustration of one embodiment of an optical switch 101 including an optical switching device 134 disposed in a semiconductor substrate layer 103 in accordance with the teachings of the present invention. As will be discussed, optical switching device 134 in one embodiment is disposed in an optical rib waveguide disposed between an optical input port 149 and an optical output port 151. In one embodiment, there is an optical path between optical input port 149 and optical path 151.

In one embodiment, optical switch 101 is a controlled collapse chip connection (C4) or flip chip packaged integrated circuit die coupled to package substrate 109 through ball bonds 107. As can be appreciated by those skilled in the art, ball bonds 107 provide more direct connections between the internal integrated circuit nodes of optical switch 101 and the pins 121 of package substrate 109, thereby reducing inductance problems associated with typical wire bond integrated circuit packaging technologies. In one embodiment, the internal integrated circuit nodes of optical switch 101 are located towards the front side 104 of optical switch 101. Another characteristic of flip chip packaging is that full access to a back side 102 of optical switch 101 is provided. It is appreciated that in another embodiment, optical switch 101 is not limited to being mounted in a flip chip packaged configuration. In other embodiments, packaging technologies other than flip chip packaging may be employed in accordance with the teachings of the present invention such as for example but not limited to wire bond packaging or the like.

In one embodiment, optical switching device 134 includes an array of trench capacitors including trench capacitor 135 and trench capacitor 137, as illustrated in FIG. 1. In one embodiment, trench capacitors 135 and 137 include polysilicon disposed in a semiconductor substrate layer 103 of optical switch 101. In one embodiment, semiconductor substrate layer 103 includes silicon. As illustrated in FIG. 1, one embodiment of optical switch 101 includes an insulating region 153 disposed between the polysilicon of trench capacitor 135 and semiconductor substrate layer 103. Similarly, an insulating region 155 is disposed between the polysilicon of trench capacitor 137 and semiconductor substrate layer 103.

In one embodiment, a signal 129 and a signal' 131 are coupled to be received by trench capacitors 135 and 137, respectively, of optical switching device 134 through conductors 119 and 121, respectively. In addition, semiconductor substrate layer 103 in one embodiment is coupled to ground 160 through conductor 158. In one embodiment, signal 129 and signal' 131 are generated by control circuitry on the integrated circuit die of optical switch 101. In one embodiment, conductors 119, 121 and 158 are coupled to trench capacitors 135, 137 and semiconductor substrate layer 103 outside the optical path between optical input port 149 and optical output port 151. Although FIG. 1 illustrates semiconductor substrate layer 103 coupled to conductor 158 in only one location, it is appreciated that conductor 158 may be coupled to semiconductor substrate layer 103 in multiple locations in other embodiments. Similarly, conductor 119 may be coupled to trench capacitor 135 in multiple locations and that conductor 121 may be coupled to trench capacitor 137 in multiple locations in accordance with the teachings of the present invention.

In one embodiment, the control circuit generating signal 129 and signal' 131 is disposed in semiconductor substrate layer 103 outside of the optical path between optical input port 149 and optical port 151. In another embodiment, signal 129 and signal' 131 are generated by control circuitry external to the integrated circuit die of optical switch 101. As shown in the embodiment of FIG. 1, trench capacitors 135 and 137 are coupled to conductors 119 and 121, respectively, which are disposed in an optical confinement layer 105 of optical switch 101. Similarly, semiconductor substrate layer 103 is coupled to conductor 158, which is disposed in optical confinement layer 105. In one embodiment, optical confinement layer 105 is an insulating layer and includes a dielectric layer of optical switch 101.

In one embodiment, signal 129 and signal' 131 are a plurality of signals separately coupled to be received by the trench capacitors 135 and 137 in optical switching device 134. For example, in one embodiment, signal 129 and signal' 131 are the same signals having opposite polarities. In another embodiment, signal 129 and signal' 131 are the same signals having the same polarities. In yet another embodiment, signal 129 and signal' 131 are separate signals coupled to capacitors across the array to control or modulate a charge distribution of free charge carriers across the array of trench capacitors 135 and 137.

As illustrated in FIG. 1, optical switch 101 includes optical input port 149 and optical output port 151 disposed in or optically coupled to semiconductor substrate layer 103 on different sides of the array of trench capacitors 135 and 137 of optical switching device 134. In one embodiment, an optical beam 111 is directed through optical input port 149 and through semiconductor substrate layer 103 to the array of trench capacitors 135 and 137 of optical switching device 134. As will be discussed, one embodiment of optical switch 101 includes an optical rib waveguide disposed in semiconductor substrate layer 103 between optical input port 149 and optical output port 151 through which optical beam 111 and a switched optical beam 127 propagate. In one embodiment, optical beam 111 is directed into optical input port 149 through an optical fiber or the like. As mentioned, in one embodiment, semiconductor substrate layer 103 include silicon, trench capacitors 135 and 137 include polysilicon and optical beam 111 includes infrared or near infrared laser light. As known to those skilled in the art, silicon is partially transparent to infrared or near infrared light. For instance, in one embodiment in which optical switch 101 is utilized in telecommunications, optical beam 111 has an infrared wavelength of approximately 1.55 or 1.3 micrometers.

As will be discussed, optical beam 111 is switched or modulated by the array of trench capacitors 135 and 137 of optical switching device 134 in one embodiment. A switched optical beam 127 is then directed from the array of trench capacitors 135 and 137 through semiconductor substrate layer 103 to optical output port 151. In one embodiment, switched optical beam 127 is directed from optical output port 151 through an optical fiber or the like. It is appreciated that in other embodiments (not shown), optical beam 111 and switched optical beam 127 may enter and/or exit semiconductor substrate layer 103 through back side 102 and/or front side 104 in accordance with the teachings of the present invention.

In one embodiment, optical switch 101 includes an optical confinement layer 157 disposed proximate to semiconductor substrate layer 103. Thus, semiconductor substrate layer 103 is disposed between optical confinement layer 157 and optical confinement layer 105. In one embodiment, optical confinement layer 157 is an insulating layer or a buried oxide layer of an SOI wafer. Optical energy or light from optical beam 111 or switched optical beam 127 is reflected from the interfaces between semiconductor substrate layer 103 and optical confinement layer 157 or optical confinement layer 105. For example, light from optical beam 111 will have an angle of incidence θ relative to the interface between semiconductor substrate layer 103 and optical confinement layer 157 or optical confinement layer 105. For purposes of this disclosure, an incident angle θ is the angle that an optical beam makes with an imaginary line perpendicular to a surface at the point of incidence. In the embodiment depicted in FIG. 1, optical beam 111 or switched optical beam 127 is deflected off the interface between semiconductor substrate layer 103 and optical confinement layer 157 or optical confinement layer 105 because of total internal reflection.

In one embodiment, optical confinement layer 157 and optical confinement layer 105 include silicon oxide or the like and have an index of refraction of approximately $n_{oxide}=1.5$ and semiconductor substrate layer 103 includes silicon and has an index of refraction of approximately $n_{Si}=3.5$. In order to have total internal reflection of optical beam 111 or switched optical beam 127, the incident angle θ of optical beam 111 or switched optical beam 127 relative to the interface between semiconductor substrate layer 103 and optical confinement layer 157 or optical confinement layer 105 satisfies the following relationship:

$$\sin\theta > n_{oxide}/n_{Si} \quad \text{(Equation 1)}$$

As a result of the total internal reflection, optical beam 111 is in one embodiment is confined to remain with semiconductor substrate layer 103 using optical confinement layer 157 and optical confinement layer 105 until switched optical beam 127 exits through optical output port 151.

As mentioned, one embodiment of optical switch 101 is constructed from an SOI wafer. In one embodiment, trench capacitors 135 and 137 are fabricated to be approximately 1–2 μm deep in semiconductor substrate layer 103. It is appreciated of course that in other embodiments, trench capacitors 135 and 137 may have different depths in accordance with the teachings of the present invention. Next, optical confinement layer 105 is formed with conductors 119 and 131 providing accesses to trench capacitors 135 and 137 and conductor 158 providing access to semiconductor substrate layer 103. Afterwards, ball bonds 107 and package substrate 109 are added. Conductors 119, 121 and 158 are coupled to regions of trench capacitors 135 and 137 and semiconductor substrate layer 103 outside the optical path between optical input port 149 and 151. Losses in optical beam 111 and/or switched optical beam 127 are reduced in accordance with the teachings of the present invention since a reduced amount of optical energy will be incident upon an interface between conductors 119, 121 and 158 and the semiconductor material of trench capacitors 135, 137 and semiconductor substrate layer 103.

Figure 2:
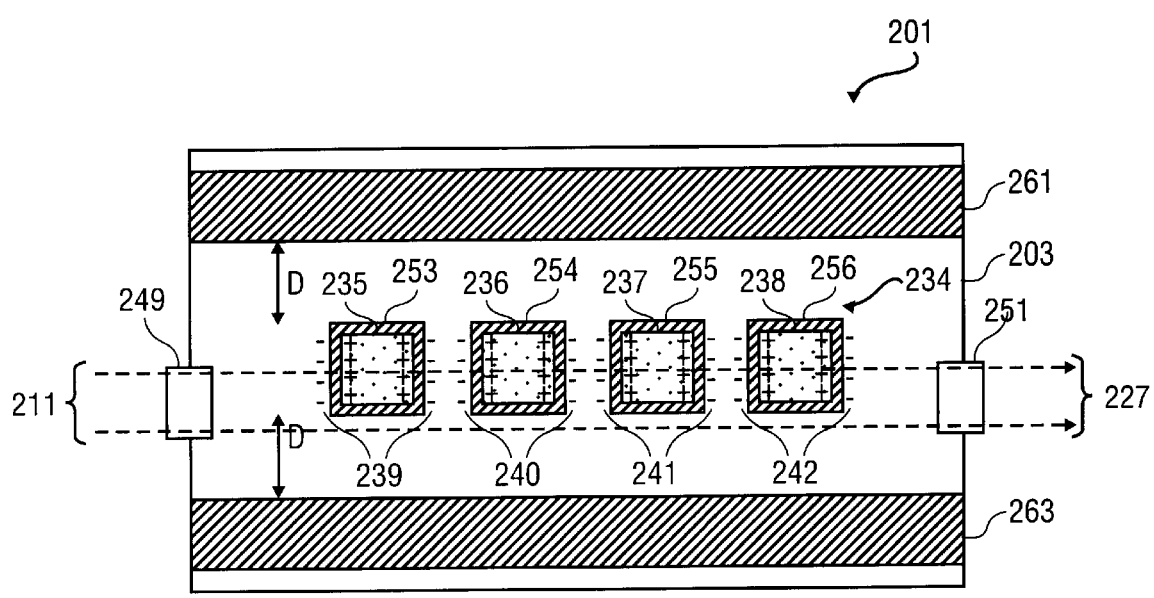
FIG. 2 is a top view illustration of one embodiment of an optical switch including an optical switching device in accordance with the teachings of the present invention.

FIG. 2 is a top view illustration of an optical switch 201 including an optical switching device 234 that is biased such that an optical beam 211 is switched in accordance with the teachings of the present invention. As illustrated, an optical switching device 234, including an array of trench capacitors 235, 236, 237 and 238, is disposed in a semiconductor substrate layer 203. Insulating regions 253, 254, 255 and 256 are disposed between semiconductor substrate layer 203 and polysilicon of trench capacitors 235, 236, 237 and 238, respectively. In one embodiment, an optical rib waveguide providing an optical path is disposed between optical input port 249 and optical output port 251. In one embodiment, conductors (not shown) to trench capacitors 235, 236, 237 and 238 and semiconductor substrate layer 203 are coupled to regions outside the optical path between optical input port 249 and optical output port 251. In one embodiment, optical fibers or the like are optically coupled to optical input port 249 and optical output port 251.

In one embodiment, optical confinement regions 261 and 263 are disposed along the sides of optical path between optical input port 249 and optical output port 251. In one embodiment, optical confinement regions 261 and 263 help define lateral optical confinement regions of the rib waveguide disposed between optical input port 249 and optical output port 251. In one embodiment, optical confinement regions 261 and 263 are disposed a distance D away from insulating regions 253, 254, 255 and 256. In one embodiment, which is a rib waveguide embodiment, the insulating regions 253, 254, 255 and 256 extend past the optical confinement regions 261 and 263, such that the distance D is less than zero. In one embodiment, D is a distance greater than or equal to zero. Accordingly, in another embodiment in which D is equal to zero, optical confinement regions 261 and 263 are adjacent to insulating regions 253, 254, 255 and 256. In one embodiment, the optical confinement regions 261 and 263 include insulative material such as for example oxide and semiconductor substrate layer 203 includes for example silicon. As a result, optical beam 211 and switched optical beam 227 are confined to remain within the semiconductor substrate layer 203 until exiting through optical output port 251. In one embodiment, optical confinement layers, similar to for example optical confinement layer 157 and optical confinement layer 105 of FIG. 1, are also disposed along the "top" and "bottom" of the optical path is disposed between optical input port 249 and optical output port 251. These optical confinement layers are not shown in FIG. 2 for clarity.

In the depicted embodiment, trench capacitors 235, 236, 237 and 238 are biased in response to signal voltages such that the concentration of free charge carriers in charged regions 239, 240, 241 and 242 of the array of trench capacitors is modulated. It is noted that for explanation purposes, charged regions 239, 240, 241 and 242 have been illustrated as including positive charge in the polysilicon of trench capacitors 235, 236, 237 and 238 and negative charge in the semiconductors substrate layer 203 across the insulating regions 253, 254, 255 and 256. It is appreciated that in another embodiment, the polarities of these charges may be reversed in accordance with the teachings of the present invention. Therefore, the polysilicon regions of trench capacitors 235, 236, 237 and 238 may be referred to as "first polarity regions" and the semiconductors substrate regions of semiconductor substrate layer 203 between trench capacitors 235, 236, 237 and 238 may be referred to as "second polarity regions" in accordance with the teachings of the present invention.

In one embodiment in which D is greater than zero, an optical beam 211 is directed through semiconductor substrate layer 203 such that a portion of optical beam 211 is directed to pass through the modulated charge regions 239, 240, 241 and 242 and a portion of optical beam 211 is not directed to pass through the modulated charge regions 239, 240, 241 and 242. As a result of the modulated charge concentration in charged regions 239, 240, 241 and 242, optical beam 211 is switched resulting in switched optical beam 227 being directed from the array of trench capacitors through semiconductor substrate layer 203.

In one embodiment, the free charge carriers attenuate optical beam 211 when passing through semiconductor substrate layer 203. In particular, the free charge carriers attenuate optical beam 211 by scattering optical beam 211 and consequently converting some of the energy of optical beam 211 into free charge carrier energy.

In another embodiment, the phase of the portion of optical beam 211 that passes through the charged regions 239, 240, 241 and 242 is modulated in response to the signal. In one embodiment, the phase of optical beam 211 passing through free charge carriers in charged regions 239, 240, 241 and 242 is modulated due to the plasma optical effect. The plasma optical effect arises due to an interaction between the optical electric field vector and free charge carriers that may be present along the propagation path of the optical beam 211. The electric field of the optical beam 211 polarizes the free charge carriers and this effectively perturbs the local dielectric constant of the medium. This in turn leads to a perturbation of the propagation velocity of the optical wave and hence the refractive index for the light, since the refractive index is simply the ratio of the speed of the light in vacuum to that in the medium. The free charge carriers are accelerated by the field and also lead to absorption of the optical field as optical energy is used up. Generally the refractive index perturbation is a complex number with the real part being that part which causes the velocity change and the imaginary part being related to the free charge carrier absorption. The amount of phase shift φ is given by $$\phi = (2\pi/\lambda)\Delta nL \quad \text{(Equation 2)}$$

with the optical wavelength λ and the interaction length L. In the case of the plasma optical effect in silicon, the refractive index change Δn due to the electron ($\Delta N_e$) and hole ($\Delta N_h$) concentration change is given by:

$$\Delta n = -\frac{e^2\lambda^2}{8\pi^2 c^2 \varepsilon_0 n_0}\left(\frac{b_e(\Delta N_e)^{1.05}}{m_e^*} + \frac{b_h(\Delta N_h)^{0.8}}{m_h^*}\right) \quad \text{(Equation 3)}$$

where $n_o$ is the nominal index of refraction for silicon, e is the electronic charge, c is the speed of light, $\varepsilon_0$ is the permittivity of free space, $m_e^*$ and $m_h^*$ are the electron and hole effective masses, respectively, $b_e$ and $b_h$ are fitting parameters.

In one embodiment, the amount of phase shift φ of some portions of optical beam 211 passing through the free charge carriers of charged regions 239, 240, 241 and 242 is approximately π/2. In one embodiment, the phase of a portion of optical beam 211 not passing though the free charge carriers of charged regions 239, 240, 241 and 242, i.e. passing through uncharged regions, is relatively unchanged. In one embodiment, a resulting interference occurs between the phase modulated portions and non-phase modulated portions of optical beam 211 passing through the array of trench capacitors 235, 236, 237 and 238. In one embodiment in which D is equal to zero, there is no portion of optical beam 211 not passing though the free charge carriers of charged regions 239, 240, 241 and 242 as optical confinement regions 261 and 263 confine optical beam 211 to pass through charged regions 239, 240, 241 and 242.

It is noted that optical switch 201 has been illustrated in FIG. 2 with four trench capacitors 235, 236, 237 and 238. It is appreciated that in other embodiments, optical switch 201 may include a greater or fewer number of trench capacitors in accordance with the teachings of the present invention with the number of trench capacitors chosen to achieve the required phase shift. In particular, the interaction length L discussed in connection with Equation 2 above may be varied by increasing or decreasing the total number of trench capacitors 235, 236, 237 and 238 in optical switching device 234 of optical switch 201.

Figure 3:
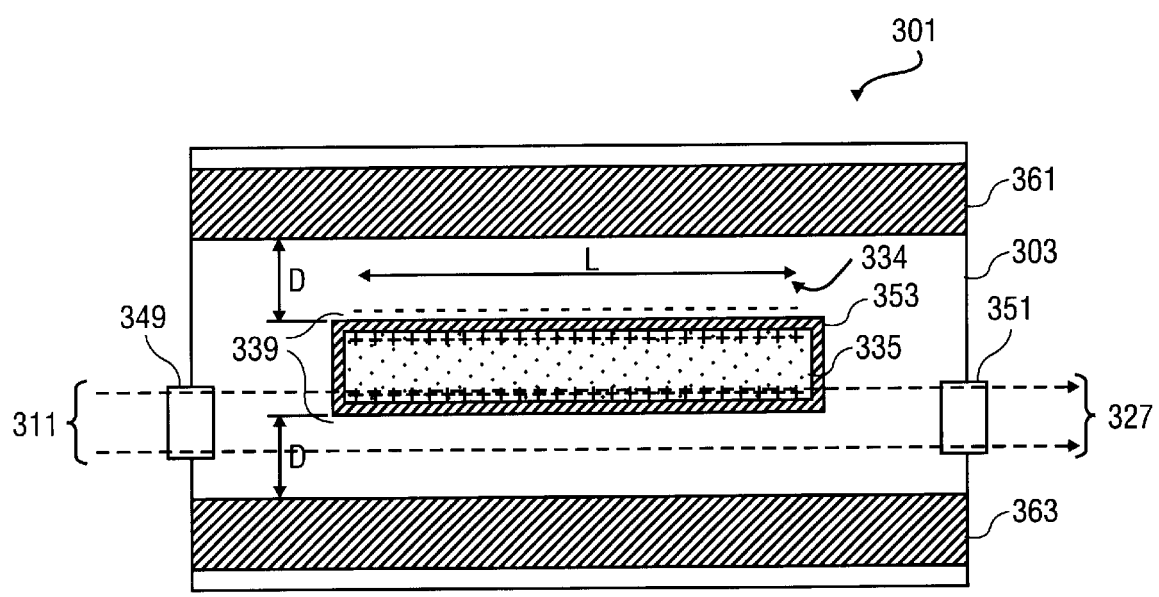
FIG. 3 is a top view illustration of another embodiment of an optical switch including an optical switching device in accordance with the teachings of the present invention.

FIG. 3 is a top view illustration of one embodiment of an optical switch 301 including an optical switching device 334 that is biased such that an optical beam 311 is switched in accordance with the teachings of the present invention. As illustrated, one embodiment of optical switch 301 includes an optical switching device 334 having a trench capacitor 335 disposed in a semiconductor substrate layer 303. An insulating region 353 is disposed between the polysilicon of trench capacitor 335 and semiconductor substrate layer 303. In one embodiment, trench capacitor 335 is one of a plurality or array of trench capacitors disposed in semiconductor substrate layer 303. In one embodiment, an optical rib waveguide providing an optical path is disposed between optical input port 349 and optical output port 351. In one embodiment, conductors (not shown) to trench capacitor 335 and semiconductor substrate layer 303 are coupled to regions outside the optical path between optical input port 349 and optical output port 351. In one embodiment, optical fibers or the like are optically coupled to optical input port 349 and optical output port 351.

In one embodiment, optical confinement regions 361 and 363 are disposed along the sides of optical path between optical input port 349 and optical output port 351. In one embodiment, optical confinement regions 361 and 363 help define lateral optical confinement regions of the rib waveguide disposed between optical input port 349 and optical output port 351. In one embodiment, optical confinement regions 361 and 363 are disposed a distance D away from insulating region 353. In one embodiment, D is a distance greater than or equal to zero. In one embodiment, the optical confinement regions 361 and 363 include insulative material such as for example oxide and semiconductor substrate layer 303 includes for example silicon. As a result, optical beam 311 and switched optical beam 327 are confined to remain within the semiconductor substrate layer 303 and well region 344 until exiting through optical output port 351. In one embodiment, optical confinement layers, similar to for example optical confinement layer 157 and optical confinement layer 105 of FIG. 1, are also disposed along the "top" and "bottom" of the optical path is disposed between optical input port 349 and optical output port 351. These optical confinement layers are not shown in FIG. 3 for clarity.

In the depicted embodiment, trench capacitor 335 is biased in response to a signal such that the concentration of free charge carriers in charged regions 339 is modulated. In an embodiment in which D is greater than zero, an optical beam 311 is directed through semiconductor substrate layer 303 such that a portion of optical beam 311 is directed to pass through the modulated charge region 339 and a portion of optical beam 311 is not directed to pass through the modulated charge region 339. As a result of the modulated charge concentration in charged region 339, optical beam 311 is switched resulting in switched optical beam 327 being directed from trench capacitor 335 through semiconductor substrate layer 303. In an embodiment in which D is equal to zero, there is no portion of optical beam 311 not passing through modulated charge region 339.

In one embodiment, the phase of the portion of optical beam 311 that passes through the charged regions 339 is modulated in response to the signal due to the plasma optical effect discussed above. As can be observed from Equation 2 above, one way to increase the phase shift φ in optical beam 311 is to increase the interaction length L of the charged region 339. In one embodiment, an increase interaction length L is provided by trench capacitor 335 by providing an increased dimension L, as illustrated in FIG. 3.

Figure 4:
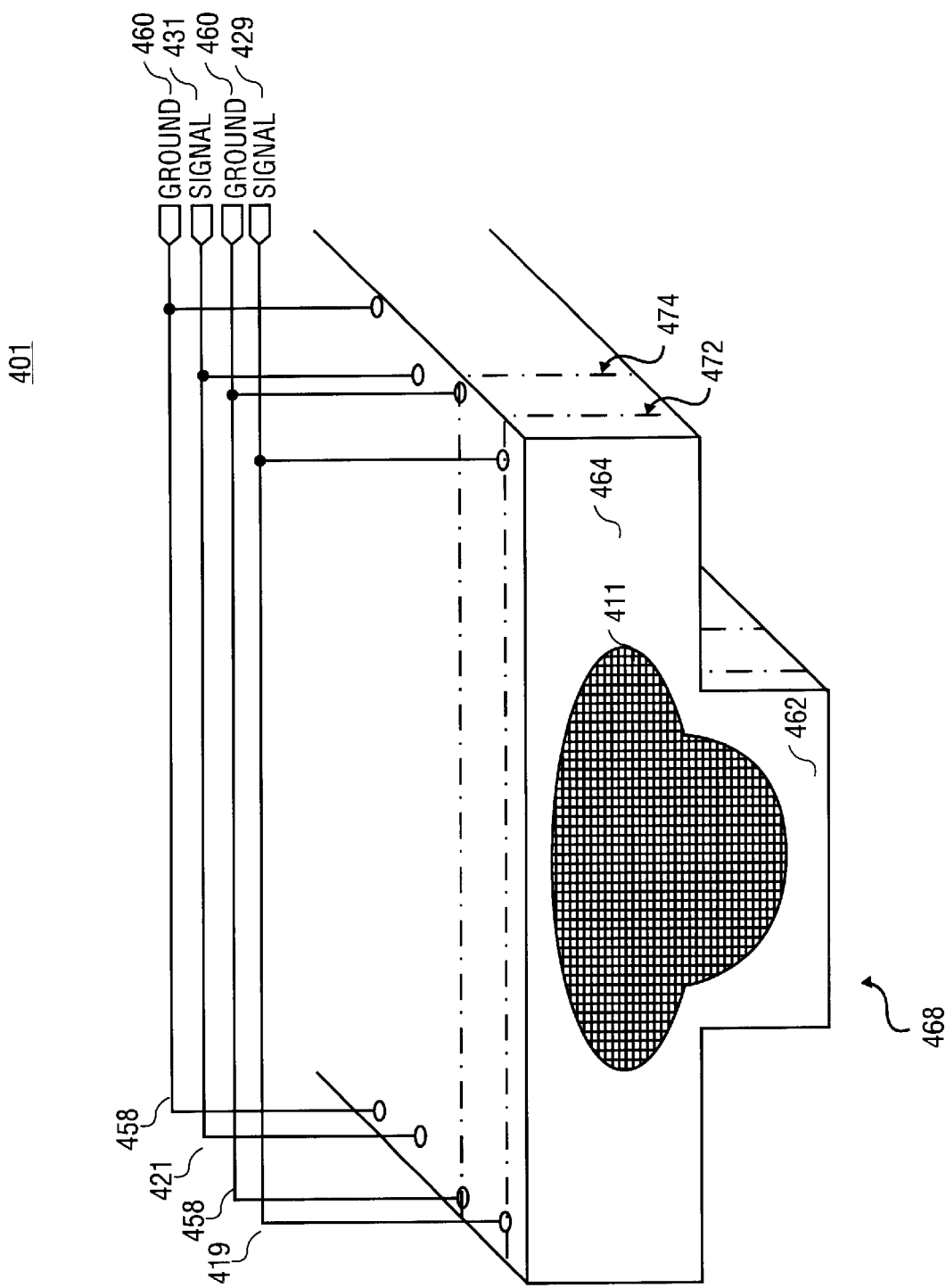
FIG. 4 is a perspective view illustration of one embodiment of an optical switch including an optical rib waveguide in accordance with the teachings of the present invention.

FIG. 4 is a perspective view illustration of one embodiment of an optical switch 401 including an optical rib waveguide 468 having regions to which conductors, such as for example conductors 419, 421 and 458, are coupled outside an optical path of an optical beam 411 propagating through optical rib waveguide 468 in accordance with the teachings of the present invention. In one embodiment, conductors 419 and 421 are coupled to apply signal 429 and signal' 431, respectively, to regions within optical rib waveguide 468 similar to as described above in connection with FIGS. 1, 2 and 3. Accordingly, in one embodiment conductors 419 and 421 are coupled to first polarity regions in optical switch 401 to modulate charge regions with the trench capacitors of optical switch 401. In one embodiment, conductors 458 couple regions of optical rib waveguide 468 to ground 460 similar to as described above in connection with FIGS. 1, 2 and 3. Accordingly, in one embodiment conductors 458 are coupled to second polarity regions between trench capacitors of optical switch 401.

In one embodiment, optical rib waveguide 468 is optically coupled between an optical input port and an optical output port, such as for example optical input and output port pairs 149 and 151, 249 and 251 and 349 and 351 of FIGS. 1, 2 and 3, respectively. Accordingly, optical rib waveguide 468 in one embodiment is formed in a semiconductor substrate layer such as for example semiconductor substrate layers 103, 203 or 303 of FIGS. 1, 2 and 3, respectively. In one embodiment, the boundaries of optical rib waveguide are defined at the interfaces between semiconductor substrate layers 103, 203 and 303 and optical confinement layers and/or regions 103, 157, 261, 263, 361 and 363 of FIGS. 1, 2 and 3, respectively.

Referring back to the example embodiment illustrated in FIG. 4, optical rib waveguide 468 includes a rib region 462 and a slab region 464. In the embodiment illustrated in FIG. 4, the intensity distribution of a single mode optical beam 411 is shown propagating through optical rib waveguide 468. As shown, the intensity distribution of optical beam 411 is such that a portion of optical beam 411 propagates through a portion of rib region 462 towards the interior to optical rib waveguide 468. In addition, the majority of the optical beam 411 propagates through a portion of slab region 464 towards the interior of optical rib waveguide 468. As also shown with the intensity distribution of optical beam 411 in FIG. 4, the intensity of the propagating optical mode of optical beam 411 is vanishingly small at "lower corners" of rib region 462 as well as the "sides" of slab region 464.

As depicted in the embodiment shown in FIG. 4, conductor 419 is coupled to regions of optical rib waveguide 468 in regions outside the optical path of optical beam 411 in the sides of slab regions 464 away from the interior of optical rib waveguide 468. Similarly, conductors 421 and 458 are coupled to regions of optical rib waveguide 468 in the sides of slab region 464 outside the optical path of optical beam 411. Accordingly, the propagation of optical beam 411 does not reach an interface between the semiconductor substrate of optical rib waveguide 468 and the conductive material of conductors 419, 421 and 458. It is appreciated that since the intensity of the propagating optical beam 411 is vanishingly small at the interfaces between the semiconductor substrate of optical rib waveguide 468 and conductive material of conductors 419, 421 and 458, the loss of the optical energy of optical beam 411 when propagating through optical rib waveguide 468 is reduced.

It is noted that conductors 419, 421 and 458 are illustrated in the embodiment of FIG. 4 as being coupled to optical rib waveguide 468 in a plurality of locations throughout the sides of slab region 464. It is appreciated that in other embodiments, conductors 419, 421 and 458 may be coupled to other regions of optical rib waveguide 468 outside the optical path of optical beam 411 or a subset of the regions illustrated in FIG. 4 in accordance with the teachings of the present invention. In one embodiment, conductors 419, 421 and 458 are coupled to optical rib waveguide 468 through an optical confinement layer such as for example optical confinement layer 105 of FIG. 1.

FIG. 5A is a cross-section illustration through a trench capacitor or a first polarity region of one embodiment of an optical switch 501 including an optical rib waveguide 568 in accordance with the teachings of the present invention. The cross-section illustration of optical switch 501 shown in FIG. 5A corresponds to a cross-section at reference numeral 472 of optical rib waveguide 468 in FIG. 4. As shown in FIG. 5A, optical rib waveguide 568 includes a rib region 562 and a slab region 564.

In one embodiment, rib region 562 is disposed proximate to optical confinement layer 557 and is disposed between lateral optical confinement regions 561 and 563. In one embodiment, optical confinement layer 557 is a buried oxide layer of an SOI wafer and is disposed between semiconductor substrate layers 503 and 559. In one embodiment, slab region 564 is disposed proximate to optical confinement layer 505. Slab region 564 is disposed between rib region 562 and optical confinement layer 505. In addition, slab region 564 is further disposed between lateral optical confinement region 561 and optical confinement layer 505 and between lateral optical confinement region 563 and optical confinement layer 505. In one embodiment, lateral optical confinement regions 561 and 563 include insulative material such as for example oxide or the like. In one embodiment, optical confinement layer 505 includes a dielectric layer of the SOI wafer through which conductors 519 and 558 are routed to carry signals.

In the embodiment illustrated in FIG. 5A, the intensity distribution of a single mode optical beam 511 is shown propagating through optical rib waveguide 568. As shown, the intensity distribution of optical beam 511 is such that of the majority of the optical beam 511 propagates through a portion of rib region 562 towards the interior to optical rib waveguide 568. In addition, a portion of optical beam 511 propagates through a portion of slab region 564 towards the interior of optical rib waveguide 568. As also shown with the intensity distribution of optical beam 511 in FIG. 4, the intensity of the propagating optical mode of beam 511 is vanishingly small at "lower corners" of rib region 562 as well as the "sides" of slab region 564.

As shown in FIG. 5A, the cross-section of optical rib waveguide 568 at reference numeral 472 of FIG. 4 includes trench capacitor 535 with insulating region 553 disposed between the polysilicon of trench capacitor 535 and semiconductor substrate layer 503. In the illustrated embodiment, conductor 519 is routed through optical confinement layer 505 to couple polysilicon of trench capacitor 535 to receive signal 529. Accordingly, conductor 519 is coupled to one of the plurality of first polarity regions of the optical switch 501.

FIG. 5B is a cross-section illustration through a second polarity region optical switch 501 including optical rib waveguide 568 in accordance with the teachings of the present invention. The cross-section illustration of optical switch 501 shown in FIG. 5B corresponds to a cross-section at reference numeral 474 of optical rib waveguide 468 in FIG. 4.

As shown in FIG. 5B, the cross-section of optical rib waveguide 568 at reference numeral 474 of FIG. 4 includes for example a semiconductors substrate layer 503 region between the trench capacitors of the optical switch 501. For instance, conductor 558 is routed through optical confinement layer 505 to couple semiconductor substrate 503 to ground. Accordingly, conductor 558 is coupled to one of the plurality of second polarity regions of the optical switch 501.

In one embodiment, optical switch 501 may be fabricated by preparing lateral optical confinement regions 561 and 563 in an active wafer, which includes semiconductor substrate layer 503 and a portion of optical confinement layer 557. A handle wafer including semiconductor substrate layer 559 and another portion of optical confinement layer 557 is then bonded to the active wafer to form the SOI wafer including semiconductor substrate layer 559, optical confinement layer 557, lateral optical confinement regions 561 and 563 and semiconductor substrate layer 503. In one embodiment, the front side of semiconductor substrate layer 503 is then thinned, polished or smoothed. Trenches are then formed in one embodiment to form the array of trench capacitors including for example insulating region 553 and the polysilicon of trench capacitor 535 as shown in FIG. 5A. In one embodiment, the front side of semiconductor substrate layer 503 is then polished or smoothed again and then optical confinement layer 505 is then formed over the front side of semiconductor substrate layer. In one embodiment, vias are then formed and conductors such as for example conductors 519 and 558 are formed in optical confinement layer 505 in the regions described above to provide optical switch 501.

Throughout this specification, it is noted that the optical switching devices described in the various embodiments herein have been illustrated using trench capacitors for discussion purposes. In accordance with the teachings of the present invention, appropriately biased trench capacitors produce an index of refraction change in the semiconductor substrate layers in which the trench capacitors are disposed. As discussed, the changes in index of refraction produce phase shifts of optical beams. In some embodiments, the effects of the phase shifts of the optical beams produce optical beam steering such that optical beams may be selectively directed to optical output ports in accordance with the teachings of the present invention. It is appreciated that in other embodiments, other types of optical switching devices may be employed in accordance with the teachings of the present invention. Other known types of optical switching devices that may be employed include for example thermal heaters, current injectors, P-N junctions, or the like.

As is known, thermal heating of the semiconductor substrate layer in the optical beam can be employed to change the index of refraction to phase shift an optical beam. In one embodiment of the present invention, known thermal heating is accomplished in an optical switching device by depositing thermal heaters on the surface of a semiconductor substrate layer in the form of polysilicon resistors or implanting diffusion based resistors and passing current through these resistors. In another embodiment, known current injectors are employed in an optical switching device for current injection to inject charge carriers into the phase shift region of in the semiconductor substrate layer. In yet another embodiment, current injection is accomplished by an optical switching device by using known forward biased diodes or P-N junctions disposed in the semiconductor substrate layer. In still another embodiment, known reverse biased P-N junctions are employed by an optical switching device, which when biased cause a depletion region to be formed in the semiconductor substrate layer. The formed depletion region causes an index change by sweeping out charge carriers in the depletion region of the semiconductor substrate layer.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
    a first optical confinement layer disposed between first and second semiconductor substrate layers;
    a second optical confinement layer disposed proximate to the first semiconductor substrate layer, the first semiconductor substrate layer disposed between the first and second optical confinement layers;
    first and second lateral optical confinement regions disposed proximate to the first optical confinement layer;
    a rib region included in the first semiconductor substrate layer disposed proximate to the first optical confinement layer and between the first and second lateral optical confinement regions; and
    a slab region included in the first semiconductor substrate layer disposed proximate to the second optical confinement layer, the slab region disposed between the second optical confinement layer and the rib region and the first and second lateral optical confinement regions.

2. The apparatus of claim 1 further comprising an optical path through the first semiconductor substrate layer, the optical path including portions of the rib region and the slab region.

3. The apparatus of claim 2 further comprising:
    a plurality of first polarity regions disposed in the first semiconductor substrate layer, the plurality of first polarity regions including the optical path; and
    a plurality of second polarity regions disposed in the first semiconductor substrate layer, the plurality of second polarity regions including the optical path; and
    an insulating region disposed between the plurality of first polarity regions and the plurality of second polarity regions.

4. The apparatus of claim 3 further comprising a first polarity region signal line conductor coupled to the plurality of first polarity regions through the second optical confinement layer.

5. The apparatus of claim 3 further comprising a second polarity region signal line conductor coupled to the plurality of second polarity regions through the second optical confinement layer.

6. The apparatus of claim 1 wherein the first and second semiconductor substrate layers, the first and second optical confinement layers and the first and second lateral optical confinement regions are included in a silicon-on-insulator (SOI) wafer.

7. The apparatus of claim 1 wherein the first and second semiconductor substrate layers comprise silicon.

8. The apparatus of claim 1 wherein the rib region and the slab region are included in an optical rib waveguide included in the first semiconductor substrate.

9. A method, comprising:

directing an optical beam through an optical rib waveguide disposed in a first semiconductor substrate layer;

confining the optical beam to remain in the optical rib waveguide with a first optical confinement layer disposed proximate to the first semiconductor substrate layer, the first optical confinement layer disposed between the first semiconductor substrate layer and a second semiconductor substrate layer;

confining the optical beam to remain in the optical rib waveguide with first and second lateral optical confinement regions disposed proximate to the first optical confinement layer, a rib region of the optical rib waveguide disposed between the first and second lateral optical confinement regions; and confining the optical beam to remain in the optical rib waveguide with a second optical confinement layer disposed proximate to the first semiconductor substrate layer, the first semiconductor substrate layer disposed between the first and second optical confinement layers, a slab region of the optical rib waveguide disposed between second optical confinement layer and the first and second lateral confinement regions and the rib region.

10. The method of claim 9 further comprising coupling a plurality of first polarity regions in the optical rib waveguide to a first polarity region signal line conductor through the second optical confinement layer.

11. The method of claim 9 further comprising coupling a plurality of second polarity regions in the optical rib waveguide to an second polarity region signal line conductor through the second optical confinement layer.

12. The method of claim 9 further comprising:

directing the optical beam into a first end of the optical rib waveguide; and directing the optical beam from a second end of the optical rib waveguide.

13. An optical rib waveguide, comprising:

a rib region included in a first semiconductor substrate layer, the rib region disposed proximate to a first optical confinement layer and disposed between first and second lateral optical confinement regions, the first optical confinement layer disposed between the first semiconductor substrate layer and a second semiconductor substrate layer; and a slab region included in the first semiconductor substrate layer, the slab region disposed between a second optical confinement layer and the rib region and the first and second lateral optical confinement regions.

14. The optical rib waveguide of claim 13 further comprising a plurality of first polarity regions included in the first semiconductor substrate, the plurality of first polarity regions coupled to a first polarity region signal line conductor through the second optical confinement layer.

15. The optical rib waveguide of claim 14 further comprising a plurality of second polarity regions included in the first semiconductor substrate proximate to the plurality of first polarity regions, the plurality of second polarity regions coupled to an second polarity region signal line conductor through the second optical confinement layer.

16. The optical rib waveguide of claim 15 further comprising an insulating region disposed between the plurality of first polarity regions and the plurality of second polarity regions.

17. The optical rib waveguide of claim 13 further comprising a plurality of trench capacitors disposed in the first semiconductor substrate layer, the plurality of trench capacitors coupled to receive a modulation signal through the second optical confinement layer.

18. The apparatus of claim 2 wherein the slab region and the rib region are comprised of a same material and contact each other.

19. The apparatus of claim 18 wherein the slab region is wider in a lateral dimension between the first and second lateral optical confinement regions than the rib region is wide in the lateral dimension between the first and second lateral optical confinement regions.

20. The apparatus of claim 19 wherein the first optical confinement layer, the second optical confinement layer, the first and second lateral optical confinement regions, the rib region, and the slab region together to serve as an inverted rib waveguide.

21. The method of claim 9 wherein the slab region and the rib region are comprised of a same material and contact each other.

22. The method of claim 21 wherein the slab region is wider in a lateral dimension between the first and second lateral optical confinement regions than the rib region is wide in the lateral dimension between the first and second lateral optical confinement regions.

23. The method of claim 22 wherein the optical rib waveguide to serve as an inverted optical rib waveguide.

24. The optical rib waveguide of claim 13 wherein the slab region and the rib region are comprised of a same material and contact each other.

25. The optical rib waveguide of claim 24 wherein the slab region is wider in a lateral dimension between the first and second lateral optical confinement regions than the rib region is wide in the lateral dimension between the first and second lateral optical confinement regions.

26. The optical rib waveguide of claim 25 wherein the optical rib waveguide to serve as an inverted optical rib waveguide.

* * * * *

UNITED STATES PATENT AND TRADEMARK OFFICE
CERTIFICATE OF CORRECTION

PATENT NO.    : 6,600,864 B2
DATED         : July 29, 2003
INVENTOR(S)   : Samara-Rubio et al.

It is certified that error appears in the above-identified patent and that said Letters Patent is hereby corrected as shown below:

<u>Title page,</u>
Item [57], ABSTRACT,
Line 14, after "semiconductor substrate", delete "walk".

Signed and Sealed this

Sixteenth Day of December, 2003

JAMES E. ROGAN
*Director of the United States Patent and Trademark Office*